(12) United States Patent
Watkins et al.

(10) Patent No.: US 11,174,042 B2
(45) Date of Patent: Nov. 16, 2021

(54) WING JOIN SYSTEM AND METHOD FOR A WING ASSEMBLY

(71) Applicant: THE BOEING COMPANY, Chicago, IL (US)

(72) Inventors: Jessica Watkins, Bothell, WA (US); Patrick B. Stone, Monroe, WA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 16/155,353

(22) Filed: Oct. 9, 2018

(65) Prior Publication Data
US 2020/0108949 A1    Apr. 9, 2020

(51) Int. Cl.
*B64F 5/10* (2017.01)
*B64C 1/26* (2006.01)

(52) U.S. Cl.
CPC . *B64F 5/10* (2017.01); *B64C 1/26* (2013.01)

(58) Field of Classification Search
CPC .................................... B64F 5/10; B64C 1/26
See application file for complete search history.

(56) References Cited

U.S. PATENT DOCUMENTS

| | | | |
|---|---|---|---|
| 6,190,484 B1 | 2/2001 | Appa | |
| 7,887,009 B2 | 2/2011 | Keeler, Jr. et al. | |
| 8,356,773 B2 | 1/2013 | Gross | |
| 8,857,765 B2 | 10/2014 | Thomas et al. | |
| 9,688,382 B2 | 6/2017 | Delahaye et al. | |
| 2005/0172470 A1 | 8/2005 | Cobb et al. | |
| 2005/0236524 A1 | 10/2005 | Sarh | |
| 2009/0282668 A1 | 11/2009 | Alvarez | |
| 2015/0013162 A1* | 1/2015 | Best | B64F 5/10 29/897.2 |
| 2015/0041004 A1* | 2/2015 | Komoda | B64D 37/04 137/565.01 |
| 2017/0314603 A1* | 11/2017 | Aston | B64C 3/26 |

FOREIGN PATENT DOCUMENTS

WO     2007099297 A1     9/2007

OTHER PUBLICATIONS

Extended European Search Report for corresponding EP Application No. 19201524.6-1010 dated Feb. 28, 2020.

\* cited by examiner

*Primary Examiner* — Moshe Wilensky
(74) *Attorney, Agent, or Firm* — The Small Patent Law Group LLC; Jay J. Hoette

(57) ABSTRACT

A method of manufacturing a wing assembly for joining to a fuselage of an aircraft includes the steps of loading a center wing section into a wing join station, loading a right wing section into the wing join station proximate to the center wing section, loading a left wing section into the wing join station proximate to the center wing section, joining the right and left wing sections to the center wing section to form a complete wing assembly, moving the complete wing assembly to a processing station, performing drilling operations on the complete wing assembly at the processing station, installing fasteners in the complete wing assembly at the processing station, and moving the complete wing assembly to a wing-body join station to join the complete wing assembly to the fuselage.

20 Claims, 8 Drawing Sheets

WING JOIN SYSTEM AND METHOD FOR A WING ASSEMBLY

BACKGROUND

The subject matter herein relates generally to a system and method for forming a wing assembly.

Aircraft manufacturing occurs in a manufacturing facility. Many systems and subsystems need to be completed, which affect overall manufacturing flow time of the aircraft. A major portion of aircraft final assembly flow time is consumed in joining the right and left wings to the center wing section attached to the main frame of the fuselage. The conventional joining method requires drilling and installing hundreds of fasteners between the right and left wings and the center wing section and between the center wing section and the fuselage, which requires significant manual labor and is very time consuming. Once the right and left wings are joined to the fuselage, further processing occurs to install other systems of the wing assembly to the aircraft, such as the fuel system, the hydraulic system, the electrical system, and the like. Additionally, the wing assembly needs to be cleaned and sealed to prepare the aircraft for painting and other processes downstream of joining the right and left wings to the fuselage. Accordingly, new methods and systems for joining aircraft wings to fuselages that require less assembly time is desirable.

BRIEF DESCRIPTION

In one example, a method of manufacturing a wing assembly for joining to a fuselage body of an aircraft is provided including the steps of loading a center wing section into a wing join station, loading a right wing section into the wing join station proximate to the center wing section, and loading a left wing section into the wing join station proximate to the center wing section. The method includes the steps of joining the right and left wing sections to the center wing section to form a complete wing assembly and moving the complete wing assembly to a processing station. The method includes the steps of performing drilling operations on the complete wing assembly at the processing station, installing fasteners in the complete wing assembly at the processing station, and moving the complete wing assembly to a wing-body join station to join the complete wing assembly to the fuselage body.

In a further example, a wing assembly manufacturing system for joining right and left wing sections to a center wing section is provided including a motion system having at least one component support tool for supporting and moving the right wing section, the left wing section, and the center wing section in a manufacturing facility. The wing assembly manufacturing system includes a metrology system having a tracking device for locating the right wing section, the left wing section, and the center wing section in the manufacturing facility. The wing assembly manufacturing system includes a positioning system having a controller communicatively coupled to the tracking device and receiving position data of the right wing section, the left wing section, and the center wing section. The controller is operably coupled to at least one component support tool to control relative positioning of the component support tool in the manufacturing facility based on the position data relating to the right wing section, the left wing section, and the center wing section. The positioning system operates the motion system to position the right wing section and the left wing section relative to the center wing section for joining the right and left wing sections to the center wing section to form a complete wing assembly prior to causing the motion system to move the complete wing assembly to a wing-body join station where the complete wing assembly is configured to be joined to a fuselage body.

DETAILED DESCRIPTION

Figure 1:
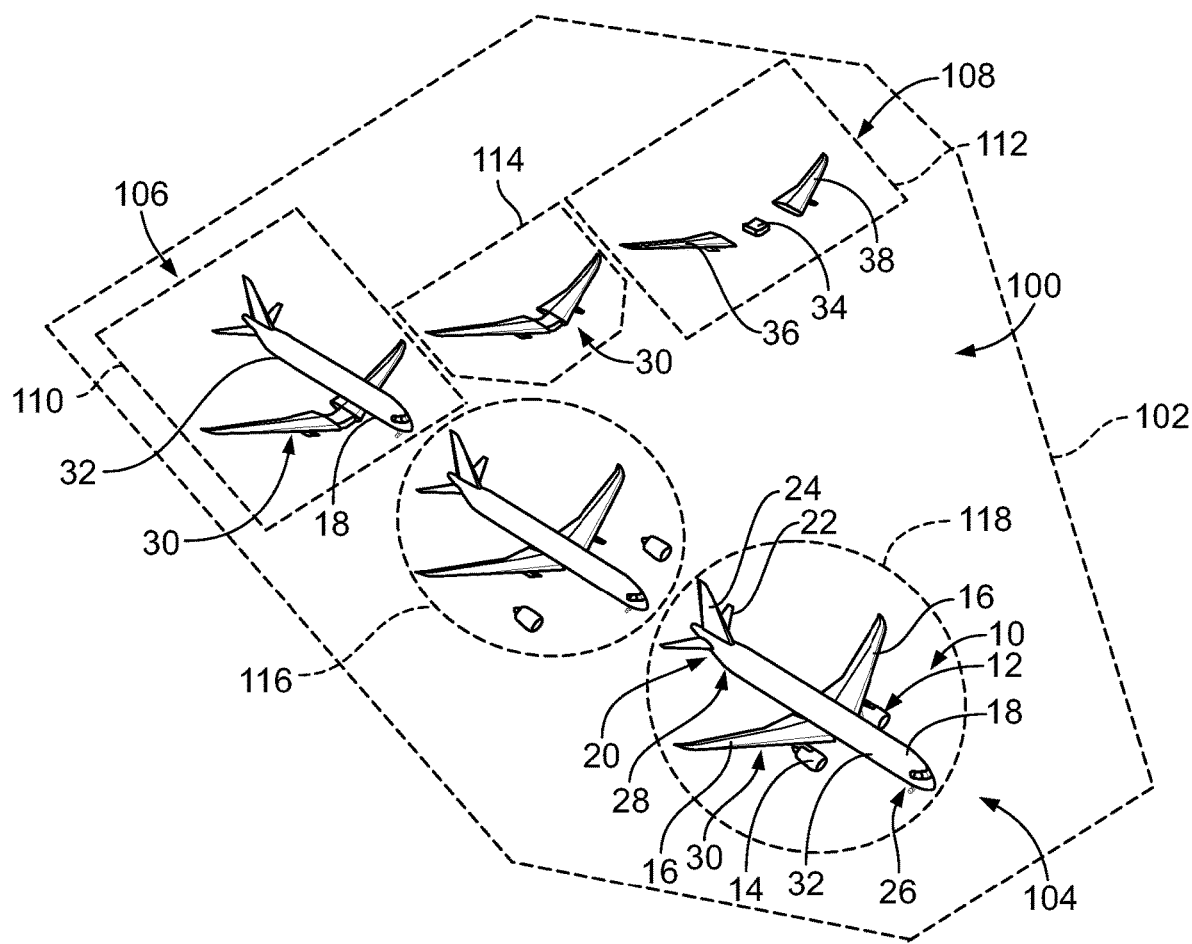
FIG. 1 is a perspective view of an aircraft assembly system in accordance with an example used to assemble an aircraft.

FIG. 1 is a perspective view of an aircraft assembly system 100 in accordance with an example used to assemble an aircraft 10. The aircraft assembly system 100 may be provided in a manufacturing facility 102. The aircraft 10 may be manufactured in stages at various stations 104 within the manufacturing facility 102. For example, various parts of the aircraft 10 may be preassembled at one or more stations and joined at other stations within the manufacturing facility 102 to complete the aircraft 10.

The aircraft 10 may be a commercial aircraft. The aircraft 10, in the illustrated example, includes a propulsion system 12 with two main engines 14 for propelling the aircraft 10. The main engines 14 may be gas turbine engines. Optionally, the propulsion system 12 may include more main engines 14 than shown. The main engines 14 may be carried by wings 16 of the aircraft 10. In other examples, the main engines 14 may be carried by a fuselage 18 and/or an empennage 20. The empennage 20 includes horizontal stabilizers 22 and a vertical stabilizer 24. The fuselage 18 of the aircraft 10 may define interior compartments or areas, such as a passenger cabin, a flight deck, a cargo area, and/or the like.

In an example, the aircraft assembly system 100 includes a main assembly line 106 having a plurality of stations 104. To reduce build time in the main assembly line 106, and thus increase throughput of the aircraft 10 through the aircraft assembly system 100, various components of the aircraft 10 may be preassembled on secondary assembly lines 108 and then transferred to the main assembly line 106 for further assembly. For example, a nose 26 of the aircraft 10 may be preassembled in a secondary assembly line 108, a tail 28 of the aircraft 10 may be preassembled in a secondary assembly line 108, a wing assembly 30 may be preassembled and a secondary assembly line 108, and the like.

FIG. 1 illustrates the wing assembly 30 in the secondary assembly line 108 used to manufacture the completed wing assembly 30. The completed wing assembly 30 may be transferred to the main assembly line 106 and attached to the fuselage 18, such as to a body 32 of the fuselage 18, at a wing-body join station 110 of the aircraft assembly system 100. The wing assembly 30 includes a center wing section 34, a right wing section 36, and a left wing section 38. The center wing section 34, the right wing section 36, and the left wing section 38 are separately assembled at one or more wing build stations 112. The center wing section 34, the right wing section 36, and the left wing section 38 are joined together at a wing join station 114 to form the complete wing assembly 30. The complete wing assembly 30 is transported from the wing join station 114 as a completed unit for joining to the fuselage 18. The engines 14 are attached to the wings 16 at an engine join station 116. The aircraft 10 may be transferred to one or more aircraft processing stations 118 downstream of the engine join station 116.

By completing the wing assembly 30 prior to transferring the wing assembly 30 to the main assembly line 106, various processing steps for manufacturing the wing assembly 30 may be completed outside of the main assembly line 106, such as in the secondary assembly line 108. For example, the right and left wing sections 36, 38 may be fastened to the center wing section 34 and such fastening may be finalized and inspected. After the sing sections 36, 38 are joined to the center wing section 34, the joined sections 34, 36, 38 may be moved through various stages or stations, such as on rails, using crawlers, using a crane, and the like for flow through the secondary assembly line 108. The wing assembly 30 may undergo a shakedown process. Various systems of the wing assembly 30 may be installed across the join area between the right and left wing sections 36, 38 and the center wing section 34, such as the fuel tank system, hydraulic systems, electrical grounding systems, and the like. Sealing of one or more components and/or systems of the wing assembly 30, which is a laborious and time consuming process, may be completed prior to transferring the wing assembly 30 to the main assembly line 106. The components and/or systems may undergo functional testing in the secondary assembly line 108 rather than the main assembly line 106. The wing assembly 30 may undergo an aqueous wash in the secondary assembly line 108 rather than the main assembly line 106. The fuel tank may undergo a closeout process in the secondary assembly line 108 rather than the main assembly line 106. By performing various processing steps in the secondary assembly line 108, the overall aircraft assembly time and floor space in the main assembly line 106 may be reduced.

Figure 2:
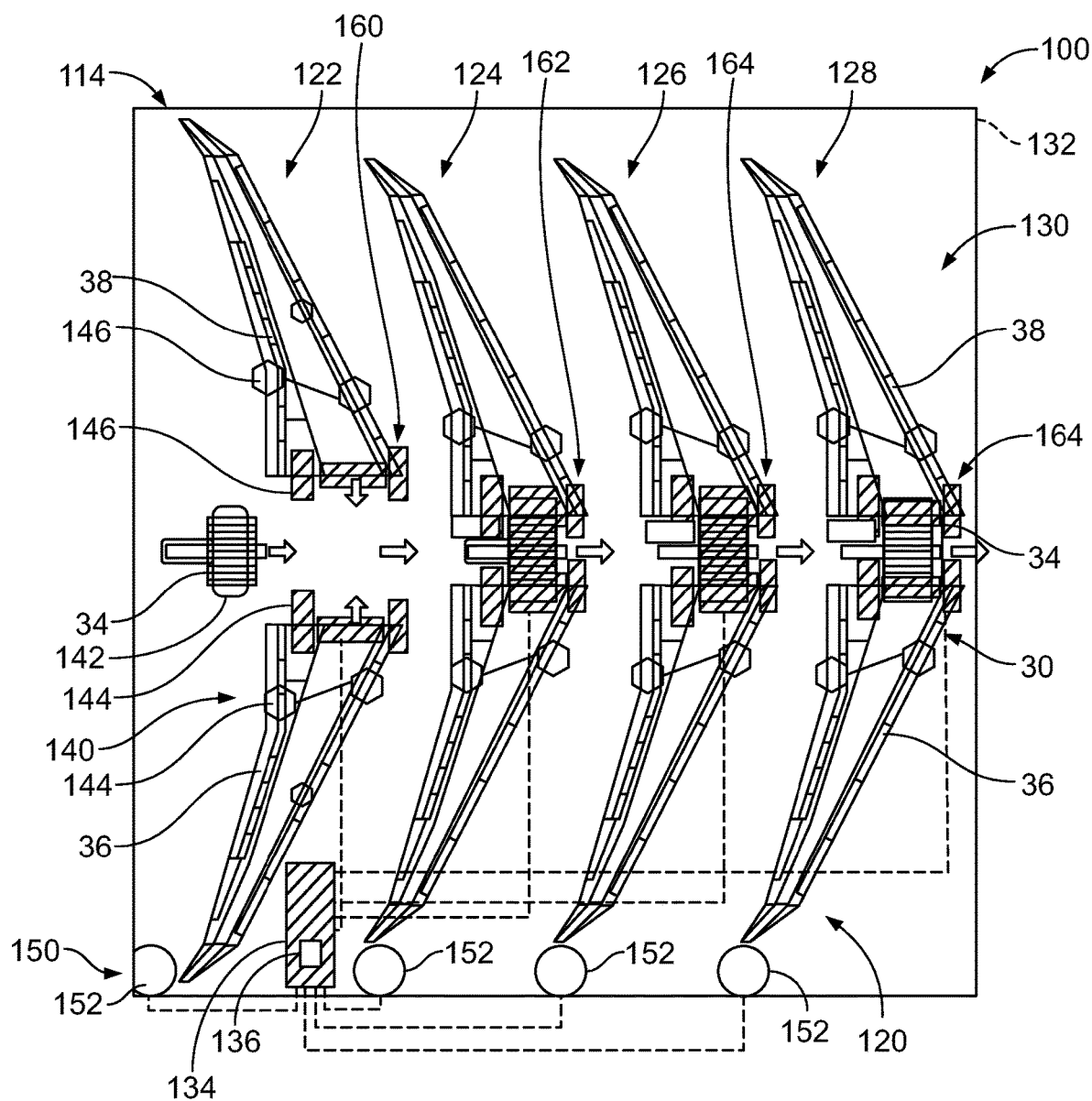
FIG. 2 is a top view of a portion of the aircraft assembly system showing a wing join station in accordance with an example.

FIG. 2 is a top view of a portion of the aircraft assembly system 100 showing the wing join station 114 in accordance with an example. The aircraft assembly system 100 includes a wing assembly manufacturing system 130 at the wing join station 114. The wing assembly manufacturing system 130 is used for joining the sections 34, 36, 38 of the wing assembly 30 in a work area 132 and processing the wing assembly 30 in the work area 132 to form a complete wing assembly 30, which may be transferred from the wing join station 114 to the wing-body join station 110 (shown in FIG. 1). The work area 132 is outside of the main assembly line 106 (shown in FIG. 1) and thus does not occupy the same physical space as the other components of the aircraft 10 during wing joining, such as the fuselage 18.

Various processing steps on the wing assembly 30 may be performed in the wing join station 114. In an example, the wing join station 114 has multiple positions or stages 120 for progressing the wing assembly 30 through the wing join station 114. Different processes are performed at different stages 120 and the wing assembly 30 is moved upstream between the stages 120 before ultimately being transferred to the wing-body join station 110. In the illustrated example, the wing join station 114 includes four stages 120. The various processes performed on the wing assembly 30 are performed at the different stages 120 such that there is little idle time at any particular stage 120. In an example, the wing assembly 30 is pulsed between the various stages 120 every two days such that a complete wing assembly 30 is completed and sent to the wing-body join station 110 every two days; however, other pulse times are possible in alternative examples.

In an example, the wing assembly manufacturing system 130 includes a positioning system 134 having a controller 136 for controlling positions of the sections 34, 36, 38 within the wing join station 114. The wing assembly manufacturing system 130 includes a motion system 140 having at least one component support tool for supporting the components and moving the components between the stages 120. For example, in an example, center wing section component support tool 142, a right wing section component support tool 144 and a left wing section component support tool 146. The component support tools 142, 144, 146 support the sections 34, 36, 38, respectively. The component support tools 142, 144, 146 are movable within the work area 132 of the manufacturing facility 102, such as between the various stages 120. In various examples, the component support tools 142, 144, 146 may be computer controlled and programmable. For example, the component support tools 142, 144, 146 may be operably coupled to the controller 136 of the positioning system 134. The controller 136 may control movement and positioning of the component support tools 142, 144, 146. The component support tools 142, 144, 146 may be movable along predefined paths. In various examples, the component support tools 142, 144, 146 may be driven and manipulated by an operator in addition to or in lieu of the controller 136.

In an example, the component support tools may include cranes or other types of overhead supports for supporting the components from overhead. In other various examples, the component support tools may include jack towers, pogo supports, or other types of supports for supporting the components from below. The component support tools may be supported by crawlers that allow movement of the component support tools between the various stages 120. In other various examples, the component support tools may be supported by carriages on rails to facilitate movement between the various stages 120. Other types of components support tools may be used in alternative examples to support the components and allow movement between the various stages 120. Optionally, one or more of the component support tools 142, 144, 146 may be removed after the right and left wing sections 36, 38 are joined to the center wing section 34. For example, the right wing section component support tool 144 and the left wing section component support tool 146 may be removed after the right and left wing sections 36, 38 are joined to the center wing section 34, such that the wing assembly 30 is entirely supported by the center wing section component support tool 142.

In an example, the wing assembly manufacturing system 130 includes a metrology system 150 having at least one tracking device 152 for locating the center wing section 34, the right wing section 36, and the left wing section 38 in the work area 132 of the manufacturing facility 102. The controller 136 is communicatively coupled to the tracking device 152 and receives position data of the center wing section 34, the right wing section 36, and the left wing section 38 from the tracking device 152. In various examples, the tracking device 152 is a laser tracking device configured to determine positions of the sections 34, 36, 38 using one or more laser beams. The sections 34, 36, 38 may include reflectors, such as retro reflectors for positioning by the tracking device 152. In other various examples, the tracking device 152 may be an image tracking device, such as a camera configured to detect positions of the sections 34, 36, 38 based on images obtained by the camera. Other types of tracking devices 152 may be used in alternative examples. In an example, the controller 136 controls relative positioning of the component support tools 142, 144, 146 in the work area 132 of the manufacturing facility 102 based on the position data obtained by the tracking device 152 relating to the center wing section 34, the right wing section 36, and the left wing section 38.

At a first stage 122, the center wing section 34 and the right and left wing sections 36, 38 are loaded into the work area 132. The sections 34, 36, 38 may be loaded into the work area 132 using the component support tools 142, 144, 146. The controller 136 may control positioning of the component support tools 142, 144, 146 in the work area 132 based on position data received by the tracking device 152. Optionally, the component support tools 142, 144, 146 may load the sections 34, 36, 38 to predetermined positions and then the metrology system 150 may be used to verify positioning of the sections 34, 36, 38 relative to each other. The positions of the component support tools 142, 144, 146 may be modified or updated based on the actual positions sensed by the tracking device 152. Once the right and left wing sections 36, 38 are oriented relative to the center wing section 34, shims may be installed between the sections 34, 36, 38. The metrology system 150 may be used to verify positioning of the shims and/or their fry proper shim gaps between the sections 34, 36, 38. In other various examples, the shim gaps may be verified manually and positioning of the sections 34, 36, 38 may be adjusted based on the verified shim gaps.

The wing assembly manufacturing system 130 includes a processing station 160 at the first stage 122. The wing assembly 30 is processed at the processing station 160. Processing involves performing one or more tasks on the wing assembly 30. Processing involves advancing or improving the wing assembly 30 closer to a complete wing assembly 30. At the processing station 160, the right and left wing sections 36, 38 are joined to the center wing section 34. For example, drilling operations may be performed at the first stage 122. Additionally, fasteners may be installed at the first stage 122 to join the right and left wing sections 36, 38 to the center wing section 34. In various examples, only a portion of the drilling operations are performed at the first stage 122 and only a portion of the fasteners are installed at the first stage 122. Other drilling operations and fastener installation is performed at a later stage, such as at a second stage 124. By performing some of the drilling and fastener installation at the first stage, the right and left wing sections 36, 38 may be fixed relative to the center wing section 34; however, further drilling and fastener installation may be needed at the later stages to complete the joining process. The initial joining may be enough to pulse the wing assembly 30 to the second stage 124 without separating the right and left wing sections 36, 38 from the center wing section 34 such that further processing may continue at the second stage 124.

Once the necessary processes are performed at the first stage 122, the wing assembly 30 is moved to the second stage 124. The positioning system 134 controls the movement between the first stage 122 and the second stage 124. The controller 136 operates the component support tools 142, 144, 146 to move the wing assembly 30 to the second stage 124. The position of the wing assembly 30 in the work area 132 may be verified by the tracking device 152 at the second stage 124.

The wing assembly manufacturing system 130 includes a processing station 162 at the second stage 124. At the processing station 162, drilling operations are performed. Additionally, fasteners may be installed at the processing station 162 to join the right and left wing sections 36, 38 to the center wing section 34. In various examples, all of the holes are drilled and all of the fasteners are installed to join the right and left wing sections 36, 38 to the center wing section 34 before the wing assembly 30 is moved to the next downstream stage. For example, the holes that were not drilled at the first processing station 160 are drilled at the second processing station 162 and the fasteners that were not installed at the first processing station 160 are installed at the second processing station 162. In various examples, the wing assembly 30 may undergo a shakedown process at the second stage 124. In various examples, the wing assembly 30 may undergo a cleaning process at the second stage 124. Other processes may occur at the processing station 162 in other various examples.

Once the necessary processes are performed at the second stage 124, the wing assembly 30 is moved to a third stage 126. The positioning system 134 controls the movement between the second stage 124 and the third stage 126. The controller 136 operates the component support tools 142, 144, 146 to move the wing assembly 30 to the third stage 126. The position of the wing assembly 30 in the work area 132 may be verified by the tracking device 152 at the third stage 126.

The wing assembly manufacturing system 130 includes a processing station 164 at the third stage 126. At the processing station 164, wing assembly systems may be installed. The wing assembly systems may be installed across the wing assembly 30, such as between the interface between the center wing section 34 and the right wing section 36 and/or between the center wing section 34 and the left wing section 38. For example, components of the fuel system may be installed, such as the fuel tanks and fuel lines. Components of the hydraulic system may be installed, such as hydraulic lines, hydraulic pumps, and the like. Components of the electrical system may be installed, such as electrical grounding components. By completing the wing assembly 30 in the wing join station 114, the components of the wing assembly systems may be installed prior to the wing assembly 30 being joined to the fuselage 18. As such, overall assembly and manufacture time of the aircraft 10 may be reduced. Assembly and manufacture time in the main assembly line 106 may be reduced because the wing assembly systems can be completed in the wing join station 114 and the secondary assembly line 108 prior to the wing assembly 30 being transferred to the main assembly line 106 and joined to the fuselage 18.

In various examples, components of the wing assembly 30 may be sealed at the third stage 126. For example, interior surfaces of the center wing section 34 and/or the right wing section 36 and/or the left wing section 38 may be sealed. Components of the wing assembly systems may be sealed.

For example, the fuel system may be sealed. Other processes may occur at the processing station 164 in other various examples.

Once the necessary processes are performed at the third stage 126, the wing assembly 30 is moved to a fourth stage 128. The positioning system 134 controls the movement between the third stage 126 and the fourth stage 128. The controller 136 operates the component support tools 142, 144, 146 to move the wing assembly 30 to the fourth stage 128. The position of the wing assembly 30 in the work area 132 may be verified by the tracking device 152 at the fourth stage 128.

The wing assembly manufacturing system 130 includes a processing station 166 at the fourth stage 128. At the processing station 166, components of the wing assembly 30 may undergo functional testing. For example, the fasteners may be tested. The wing assembly systems may be tested. For example, the fuel system, the hydraulic system, the electrical system, or other systems may be tested. The sealing of the wing assembly 30 may be tested. At the processing station 166, the wing assembly 30 may undergo an aqueous wash. At the processing station 166, the tank of the fuel system may be closed out. Other processes may occur at the processing station 166 in other various examples.

Once the necessary processes are performed at the fourth stage 128, the wing assembly 30 is complete and configured to be moved to the wing-body join station 110. The positioning system 134 may control the movement to the wing-body join station 110. In other various examples, the complete wing assembly 30 may be transferred from the component support tools 142, 144, 146 of the motion system 140 to another component, such as a crawler to transfer the complete wing assembly 30 to the wing-body join station 110.

Figure 3:
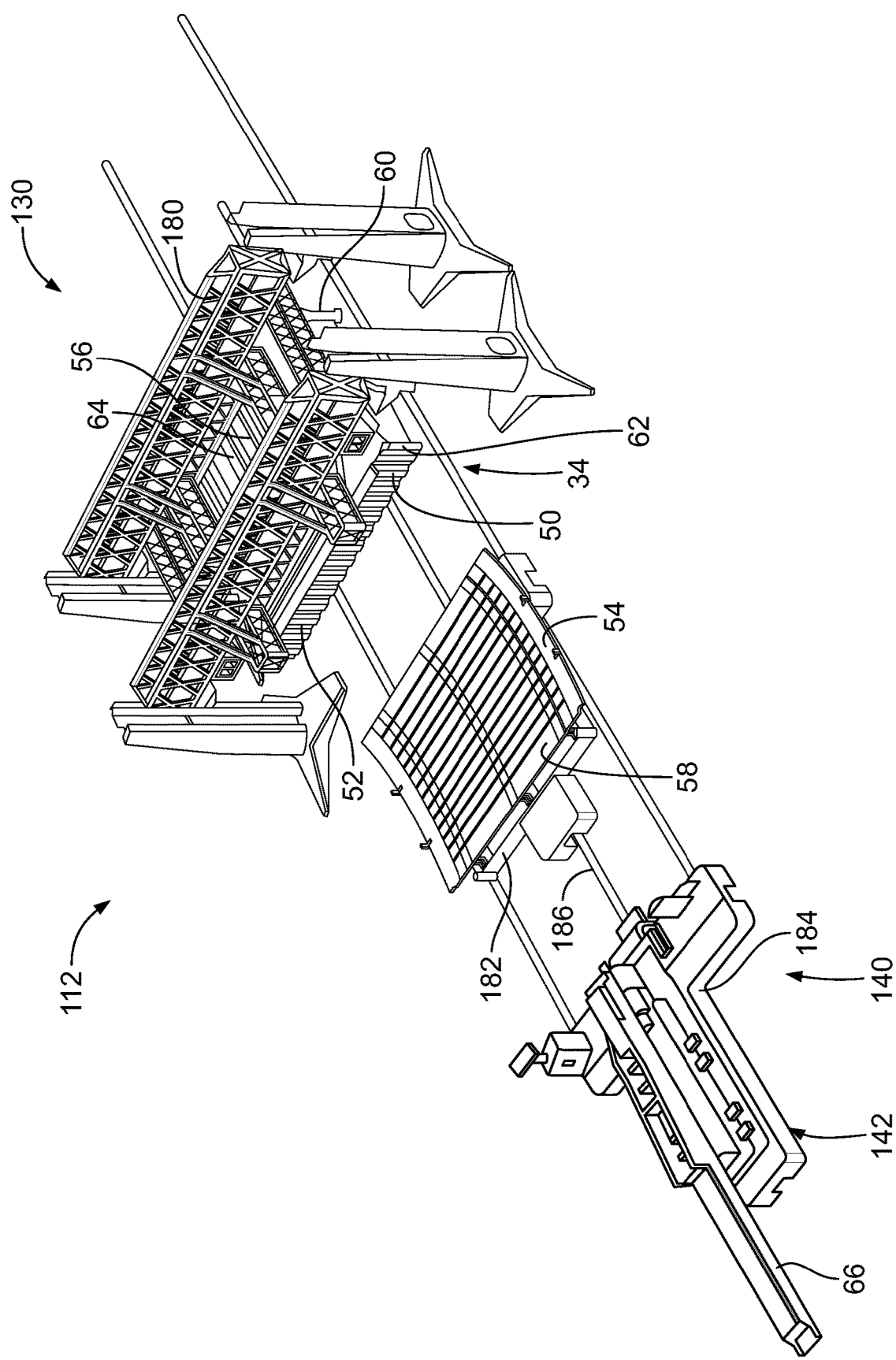
FIG. 3 is a perspective view of a wing build station of the aircraft assembly system in accordance with an example for building a center wing section.

FIG. 3 is a perspective view of the wing build station 112 in accordance with an example using the wing assembly manufacturing system 130 to build the center wing section 34. The motion system 140 supports components of the center wing section 34 in the work area. For example, in the illustrated example, the center wing section component support tool 142 includes a crane 180 supporting components of the center wing section 34. The center wing section component support tool 142 includes a crawler 182 supporting components of the center wing section 34. The crawler 182 moves the components into position for building the center wing section 34. The center wing section component support tool 142 includes a carriage 184 on rails 186 carrying components of the center wing section 34. The carriage 184 moves the components into position for building the center wing section 34.

The center wing section 34 includes a wing box 50 having a wing box frame 52 and a wing box skin 54 on the wing box frame 52. For example, the wing box skin 54 includes an upper skin 56 and a lower skin 58. The wing box frame 52 includes a front box spar 60 and a rear box spar 62. The wing box frame 52 includes box ribs 64 extending between the front and rear box spars 60, 62 or between spanwise beams. The wing box 50 is configured to be mounted to a lower keel beam 66. In the illustrated example, the lower keel beam 66 is supported by the carriage 184 and configured to be moved under the wing box 50 for joining to the wing box 50. In the illustrated example, the lower skin 58 is supported by the crawler 182 and configured to be moved under the wing box frame 52 by the crawler 182. In the illustrated example, the wing box frame 52 and the upper skin 56 are supported by the crane 180. The lower skin 58 and the lower keel beam 66 are configured to be joined to the wing box frame 52 in the wing build station 112. Once the center wing section 34 is assembled, the center wing section 34 may be moved to the wing join station 114 (shown in FIG. 2).

Figure 4:
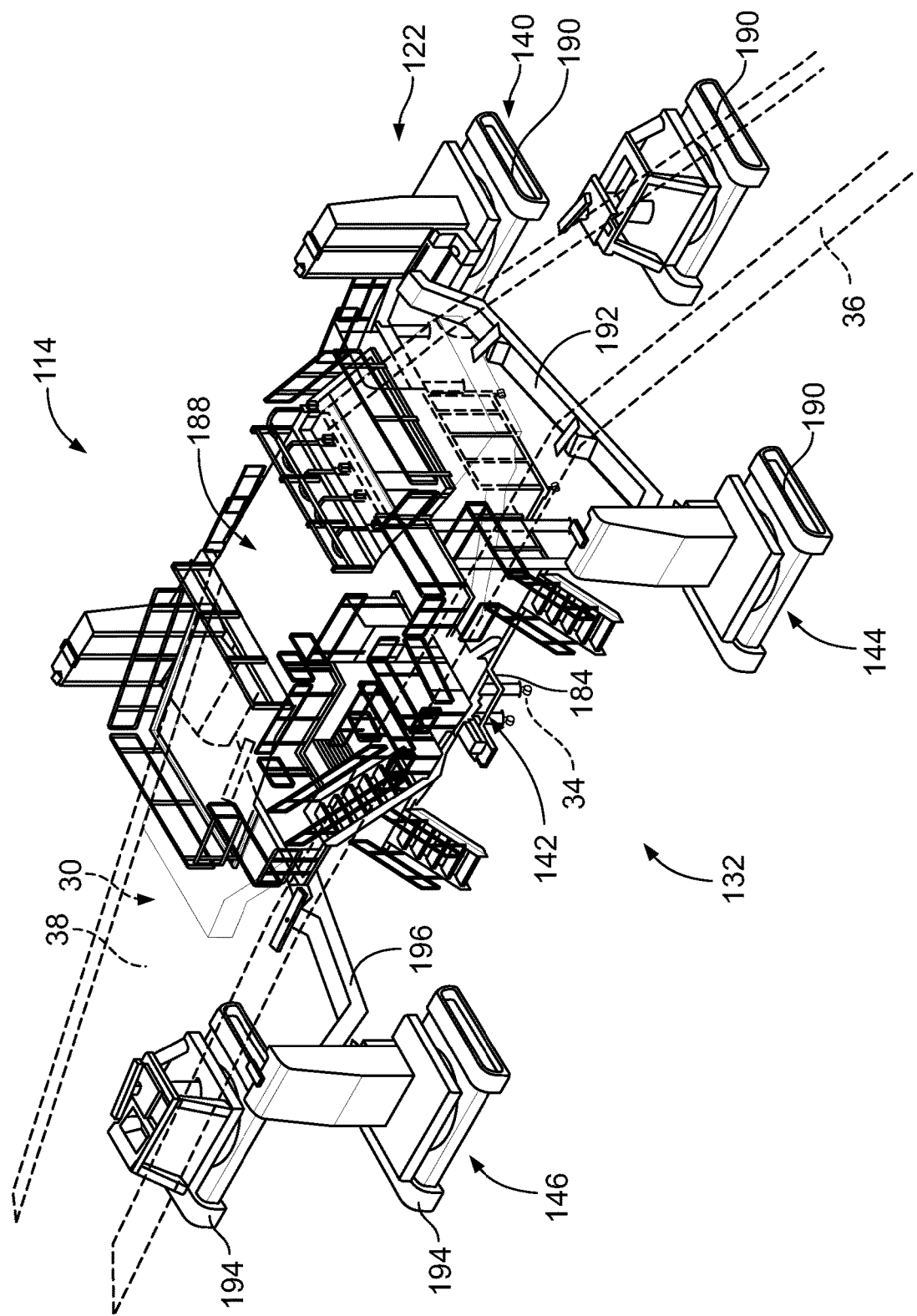
FIG. 4 is a perspective view of a portion of the wing join station in accordance with an example.

FIG. 4 is a perspective view of a portion of the wing join station 114 showing the wing assembly 30 in phantom at the first stage 122. The right and left wing sections 36, 38 are joined to the center wing section 34 at the wing join station 114. A work platform 188 is illustrated in FIG. 4 positioned around the wing assembly 30 to allow personnel to work on the wing assembly 30. The work platform 188 allows the personnel to access the upper and lower surfaces of the wing assembly 30, such as for drilling holes, installing fasteners, or performing other processes on the wing assembly 30, such as cleaning the wing assembly 30, sealing the wing assembly 30, installing systems in the wing assembly 30, and the like.

The motion system 140 supports the center wing section 34, the right wing section 36, and the left wing section 38 in the work area 132. For example, the center wing section 34 may be supported by the carriage 184 (shown in FIG. 3). In the illustrated example, the right wing section component support tool 144 includes crawlers 190 supporting the right wing section 36. The crawlers 190 may be positioned in front of and behind the right wing section 36 with a support beam 192 connected therebetween for supporting the right wing section 36. In other various examples, the crawlers 190 may be provided directly below the right wing section 36 for supporting the right wing section 36. When using multiple crawlers 190, movements of the crawlers 190 may be coordinated in unison, such as using the positioning system 134 (shown in FIG. 2). In other various examples, rather than using crawlers, the right wing section component support tool 144 may include one or more carriages on rails. In the illustrated example, the left wing section component support tool 146 includes crawlers 194 supporting the left wing section 38. The crawlers 194 may be positioned in front of and behind the left wing section 38 with a support beam 196 connected therebetween for supporting the left wing section 38. In other various examples, the crawlers 194 may be provided directly below the left wing section 38 for supporting the left wing section 38. When using multiple crawlers 194, movements of the crawlers 194 may be coordinated in unison, such as using the positioning system 134. In other various examples, rather than using crawlers, the left wing section component support tool 146 may include one or more carriages on rails.

The component support tools 142, 144, 146 may be used to move the wing assembly 30 to the next stage in the wing join station 114. In various examples, once the right and left wing sections 36, 38 are joined to the center wing section 34, one or more of the component support tools 142, 144, 146 may be taken off-line. For example, the component support tools 144, 146 may be unnecessary once the right and left wing sections 36, 38 are joined to the center wing section 34. In such examples, the center wing section component support tool 142 may be used to support the entire wing assembly 30 and move the wing assembly 30 between the various stages of the wing join station 114. In other examples, the component support tools 144, 146 may be used to support the wing assembly 30 through the downstream stages, thus eliminating the need for the center wing section component support tool 142 after the right and left wing sections 36, 38 are joined to the center wing section 34.

Figure 5:
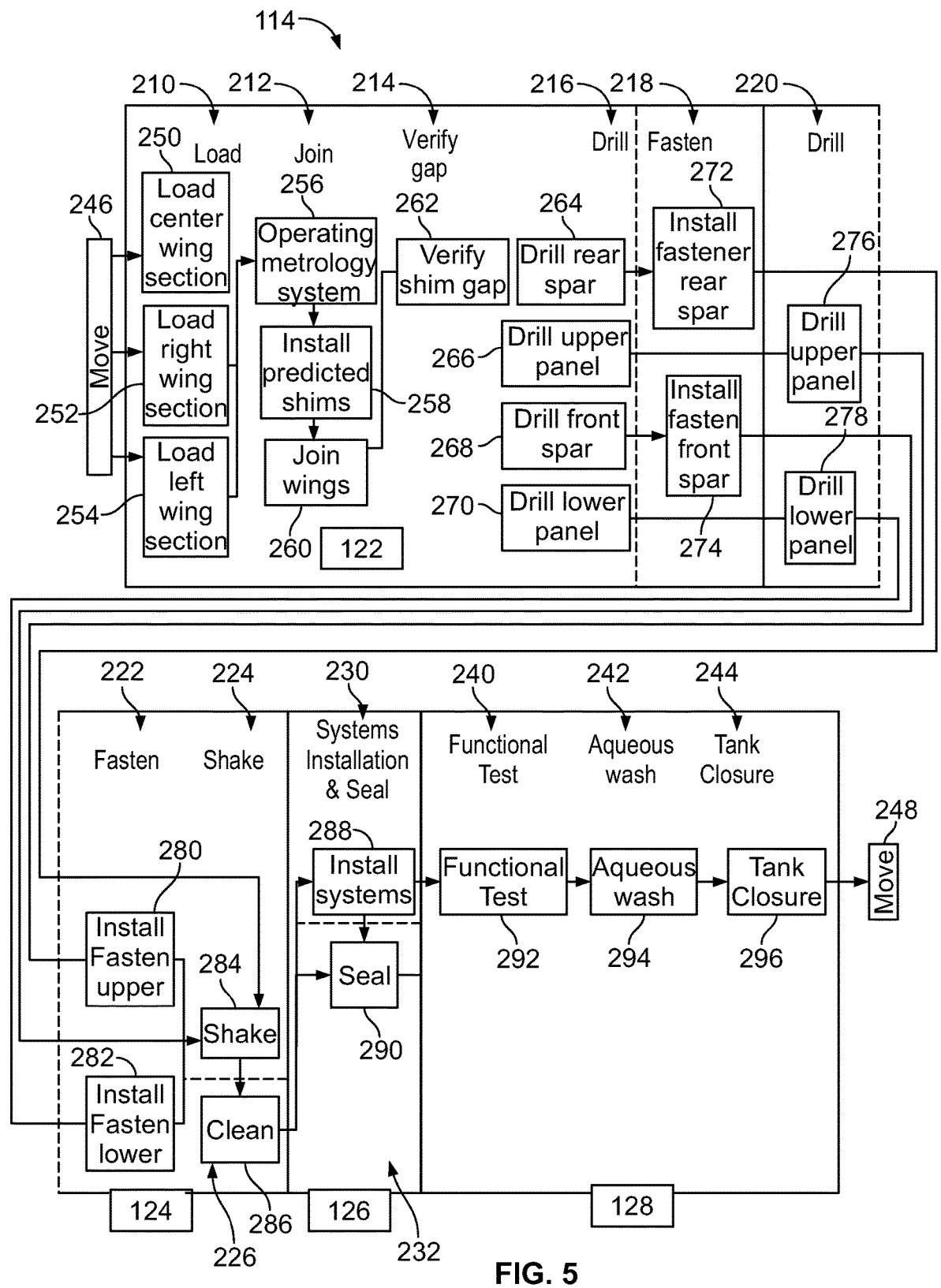
FIG. 5 is a process flow chart for manufacturing a wing assembly in accordance with an example.

FIG. 5 is a process flow chart for manufacturing a wing assembly 30 in accordance with an example. FIG. 5 illustrates processes performed at the various stages 120 (such as shown in FIG. 2) of the wing join station 114 in accordance with an example. The stages 120 may be broken up into process blocks. Various processes may be performed in the corresponding process blocks. Optionally, the process blocks may be performed sequentially. During manufacture, the process blocks may overlap in time such that one or more processes from one process block may begin prior to all of the processes from a prior process block being completed.

At the first stage 122, the manufacturing method includes a loading process block 210, a joining process block 212, a verifying gap process block 214, a drilling process block 216 and a fastening process block 218. At the second stage 124, the manufacturing method includes a drilling process block 220, a fastening process block 222, a shakedown process block 224, and a cleaning process block 226. At the third stage 126, the manufacturing method includes a system installing process block 230, and a sealing process block 232. At the fourth stage 128, the manufacturing method includes a functional testing process block 240, an aqueous washing process block 242, and a tank closure process block 244.

The manufacturing method includes moving 246 the wing assembly 30 between processing stations at the various stages 120. For example, the motion system 140 may be used to move the wing assembly 30 between the processing stations. In an example, moving the wing assembly 30 includes using the positioning system 134 to initially positions the center wing section 34 and the right and left wing sections 36, 38 in a wing join station where the right and left wing sections 36, 38 are joined to the center wing section 34. In an example, moving the wing assembly 30 includes moving the joined or compete wing assembly 30, such as using the positioning system 134, the motion system 140 and/or the metrology system 150, to a processing station for processing the complete wing assembly 30 prior to moving the complete wing assembly 30 to the wing-body join station. In an example, moving the complete wing assembly 30 includes moving the center wing section 34 with the right and left wing sections 36, 38 joined thereto as a unit independent of the fuselage 18 to one or more processing stations and/or to the wing-body join station 110. The component support tools 142, 144, 146 may be used to move the wing assembly 30 between the processing stations. In an example, moving the wing assembly 30 to various processing stations includes using the tracking device 152 of the metrology system 150 to locate the wing assembly 30 in the processing station. Moving the wing assembly 30 to various processing stations includes using the positioning system 134 and the motion system 140. For example, moving the wing assembly 30 includes using the controller 136 to determine relative positions of the center wing section 34, the right wing section 36, and the left wing section 38 to locate the sections 34, 36, 38 in the processing station. In an example, the complete wing assembly 30 may be moved to multiple processing stations within the wing join station 114 prior to moving the complete wing assembly 30 to the wing-body join station 110. The manufacturing method includes moving 248 the complete wing assembly 30 from the wing join station 114 to the wing-body join station 110 to join the complete wing assembly 30 to the fuselage 18.

One or more processes may be performed at each of the corresponding process blocks. In an example, the loading process block 210 of the manufacturing method includes loading 250 a center wing section 34 into a wing join station 114. The loading process block 210 of the manufacturing method includes loading 252 a right wing section 36 into the wing join station 114 proximate to the center wing section 34 and loading 254 a left wing section 38 into the wing join station 114 proximate to the center wing section 34. In an example, the motion system 140 of the wing assembly manufacturing system 130 is used for loading the center wing section 34, the right wing section 36, and the left wing section 38. For example, at least one of the component support tools 142, 144, 146 may be used to load the center wing section 34, the right wing section 36, and the left wing section 38. The component support tools 142, 144, 146 may be moved by cranes, crawlers, carriages on rails, and the like to position the sections 34, 36, 38 relative to each other.

The joining process block 212 of the manufacturing method includes operating 256 the metrology system 150 to determine positions of the center wing section 34, the right wing section 36, and the left wing section 38. The metrology system 150 may be operated in a join metrology shoot operation where the tracking device 152 shoot laser beams in the work area to determine positions of the center wing section 34, the right wing section 36, and the left wing section 38. In other various examples, the tracking device 152 may include a camera that obtains image data rather than a laser tracking device that shoots laser beams for determining positional information of the sections 34, 36, 38. The tracking device 152 generates positional data relating to the positions of the sections 34, 36, 38 and transmits the position data to the positioning system 134. The controller 136 processes they position data to determine whether or not the sections 34, 36, 38 are in proper positions or if the sections 34, 36, 38 need to be moved. If one or more of the sections 34, 36, 38 need to be moved, the controller 136 may cause the component support tools 142, 144, 146 to reposition.

The joining process block 212 of the manufacturing method includes installing 258 shims between the sections 34, 36, 38. Shimming may occur at interfaces between the right and left wing sections 36, 38 and the center wing section 34. The shims may be manually installed by personnel in various examples. The shims may be used to accurately position the sections 34, 36, 38 relative to one another for the joining process.

The joining process block 212 of the manufacturing method includes joining 260 the right and left wing sections 36, 38 with the center wing section 34 to form a complete wing assembly 30.

The verifying gap process block 214 of the manufacturing method includes verifying 262 the shim gaps between the right and left wing sections 36, 38 and the center wing section 34. The shims gaps may be verified by manual inspection by personnel, such as using feeler gages or other measuring devices. In other various examples, the shims gaps may be verified using the metrology system 150.

The drilling process block 216 of the manufacturing method includes performing drilling operations 264 on the rear box spar 62, performing drilling operations 266 on the upper skin 56, performing drilling operations 268 on the front box spar 60, and performing drilling operations 270 on the lower skin 58. The drilling operations may include drilling holes in the sections 34, 36, 38. For example, the holes may be drilled through the right wing section 36 and the center wing section 34 or the holes may be drilled through the left wing section 38 and the center wing section 34 such that the holes are aligned for receiving fasteners. In various examples, the drilling of the upper skin 56 and the drilling of the lower skin 58 are only partially complete during the drilling operations at the first stage 122. For example, due to the number of holes that need to be drilled, some of the holes may be drilled at the first stage 122 while the rest of the holes may be drilled at the second stage 124 during the drilling process block 220. In various examples, approximately 50% of the holes may be drilled at the first stage 122; however, greater or fewer of the holes may be drilled at the first stage 122 depending on the time available for performing the necessary processes at the first stage 122 and the necessary processes at the second stage 124 such that the overall cycle time at each stage is approximately equal or close to takt time. By splitting up the drilling processes between the first and second stages 122, 124, the overall processing times at each of the stages 120 may be evened out to meet takt time. In various examples, the drilling of the front box spar 60 and the rear box spar 62 are completed during the drilling operations at the first stage 122 such that the right and left wing sections 36, 38 may be joined to the centers wing section 34, using the fasteners, at the front and rear box spars 60, 62 prior to transferring the wing assembly 30 to the second stage 124.

The fastening process block 218 of the manufacturing method includes installing 272 fasteners in the rear box spar 62 and installing 274 fasteners in the front box spar 60. The fasteners are installed in the holes drilled through the front and rear box spars 60, 62. The fasteners couple the right and left wing sections 36, 38 to the center wing section 34 at the front and rear box spars 60, 62. The fasteners may be installed manually. The fasteners may be installed by robots. The fasteners join the right and left wing sections 36, 38 to the center wing section 34 to form the wing assembly 30. The fasteners may be screws, nuts and bolts, or other types of fasteners. In other various examples, fasteners may additionally be installed in the upper and lower skins 56, 58 at the first stage 122.

The drilling process block 220 of the manufacturing method includes performing drilling operations 276 on the upper skin 56 and performing drilling operations 278 on the lower skin 58. The drilling operations may include drilling holes in the sections 34, 36, 38. The number of holes drilled at the second stage 124 depends on the number of holes able to be drilled at the first stage 122. In various examples, all of the holes are drilled in the first and second stages 122, 124 such that any holes not drilled during the first stage 122 are drilled during the second stage 124. In other various examples, the drilling process block 220 may additionally include performing drilling operations on the front and rear box spars 60, 62, if all of the drilling operations were not performed at the first stage 122.

The fastening process block 222 of the manufacturing method includes installing 280 fasteners in the upper skin 56 and installing 282 fasteners in the lower skin 58. The fasteners are installed in the holes drilled through the upper and lower skins 56, 58. The fasteners couple the right and left wing sections 36, 38 to the center wing section 34 at the upper and lower skins 56, 58. The fasteners join the right and left wing sections 36, 38 to the center wing section 34 to form the wing assembly 30. In other various examples, fasteners may additionally be installed in the front and rear box spars 60, 62, if all of the fasteners or not so installed at the first stage 122.

The shakedown process block 224 of the manufacturing method includes performing a shake down 284 of the complete wing assembly 30 prior to moving the complete wing assembly 30 to the wing-body join station 110. The aircraft shakedown may include checking avionics, flight controls, other systems and/or airworthiness of the wing assembly 30.

The cleaning process block 226 of the manufacturing method includes cleaning 286 the complete wing assembly 30 prior to moving the complete wing assembly 30 to the wing-body join station 110. Cleaning the wing assembly 30 includes removing debris from interior surfaces and/or exterior surfaces of the sections 34, 36, 38 of the wing assembly 30. Cleaning the wing assembly 30 includes wiping down the interior surfaces and/or the exterior surfaces of the wing assembly 30. By cleaning the wing assembly 30 in the wing join station 114, manufacturing of the wing assembly 30 is advanced prior to transferring the wing assembly 30 to the main assembly line 106. For example, other processing steps may be performed after the surfaces are cleaned. As such, manufacturing time on the main assembly line 106 may be reduced.

The systems installing process block 230 of the manufacturing method includes installing 288 wing assembly systems in the complete wing assembly 30 prior to moving the complete wing assembly 30 to the wing-body join station 110. The wing assembly systems may be installed across the wing assembly 30, such as between the interface between the center wing section 34 and the right wing section 36 and/or between the center wing section 34 and the left wing section 38. Installing wing assembly systems may include installing a fuel system. For example, components of the fuel system, such as the fuel tanks and fuel lines, may be installed. In an example, the method may include communicatively coupling a first fuel component in the center wing section 34 and a second fuel component in the right wing section 36 and a third fuel component in the left wing section 38 prior to moving the complete wing assembly 30 to the wing-body join station 110.

Installing wing assembly systems may include installing a hydraulic system. For example, components of the hydraulic system, such as hydraulic lines, hydraulic pumps, and the like, may be installed. In an example, the method may include hydraulically coupling a first hydraulic component in the center wing section 34 and a second hydraulic component in the right wing section 36 and a third hydraulic component in the left wing section 38 prior to moving the complete wing assembly 30 to the wing-body join station 110.

Installing wing assembly systems may include installing electrical systems. For example, components of the electrical system, such as electrical wiring, electrical grounding components, and the like, may be installed. Installing wing assembly systems may include installing electrical grounding systems and the complete wing assembly 30 prior to moving the complete wing assembly 30 to the wing-body join station 110. In an example, the method may include electrically coupling a first electrical component in the center wing section 34 and a second electrical component in the right wing section 36 and a third electrical component in the left wing section 38 prior to moving the complete wing assembly 30 to the wing-body join station 110.

By installing one or more of the wing assembly systems in the wing join station 114, manufacturing of the wing assembly 30 is advanced prior to transferring the wing assembly 30 to the main assembly line 106. The flow and labor may be performed in the wing join station 114 to reduce manufacturing time in the main assembly line 106.

The sealing process block 232 of the manufacturing method includes performing sealing operations 290 on interior surfaces and/or exterior surfaces of the complete wing assembly 30 prior to moving the complete wing assembly 30 to the wing-body join station 110. For example, the joints between the right and left wing sections 36, 38 and the center wing section 34 may be sealed. The fasteners may be sealed. Interior structures may be sealed. Wing assembly system components may be sealed, such as within the frame, the fuel system, the hydraulic system, the electrical system, and the like. The sealing of the wing assembly 30 may be completed at the wing join station 114 prior to moving the complete wing assembly 30 to the wing-body join station 110. By sealing the wing assembly 30 in the wing join station 114, manufacturing of the wing assembly 30 is advanced prior to transferring the wing assembly 30 to the main assembly line 106. As such, manufacturing time on the main assembly line 106 may be reduced.

The functional testing process block 240 of the manufacturing method includes functional testing 292 of the wing assembly 30. Functional testing of the wing assembly 30 may include mechanical testing of the joints between the right and left wing sections 36, 38 and the center wing section 34. For example, the functional testing may include testing of the fasteners securing the right and left wing sections 36, 38 to the center wing section 34. Functional testing may include testing of the electrical conductivity of the fasteners for bonding and ground requirements. Functional testing of the wing assembly 30 may include testing of the wing assembly systems. For example, the functional testing may include testing of the fuel system, such as for operation of the fuel system, leaking of the fuel system, and the like. The functional testing may include testing of the hydraulic system, such as for operation of the hydraulic system, leaking of the hydraulic system, and the like. The functional testing may include testing of the electrical system, such as for electrical connection of wiring of the electrical system, electrical connection of grounding connections of the electrical system, and the like. By functional testing the wing assembly 30 in the wing join station 114, manufacturing of the wing assembly 30 is advanced prior to transferring the wing assembly 30 to the main assembly line 106. As such, manufacturing time on the main assembly line 106 may be reduced.

The aqueous washing process block 242 of the manufacturing method includes aqueous washing 294 the wing assembly 30. Aqueous washing the wing assembly 30 includes washing and spraying a cleaning solution into cavities and on surfaces. The solution may then be wiped down. Aqueous washing the wing assembly 30 includes removing debris from interior surfaces and/or exterior surfaces of the sections 34, 36, 38 of the wing assembly 30. By aqueous washing the wing assembly 30 in the wing join station 114, manufacturing of the wing assembly 30 is advanced prior to transferring the wing assembly 30 to the main assembly line 106. As such, manufacturing time on the main assembly line 106 may be reduced.

The tank closure process block 244 of the manufacturing method includes closing out 296 the fuel tank of the complete wing assembly 30 prior to moving the complete wing assembly 30 to the wing-body join station 110. Closing the fuel tank may include joining or connecting different sections or components of the fuel tank together. Closing the fuel tank may include sealing the fuel tank. Because the right and left wing sections 36, 38 are joined to the center wing section 34, the fuel tank in the center wing section 34 and the right and left wing sections 36, 38 may be joined and closed in the wing join station 114, prior to joining the center wing section 34 to the fuselage 18. As such, the fuel system and the fuel tank may be completed and closed prior to transferring the completed wing assembly 30 to the wing-body join station 110.

Figure 6:
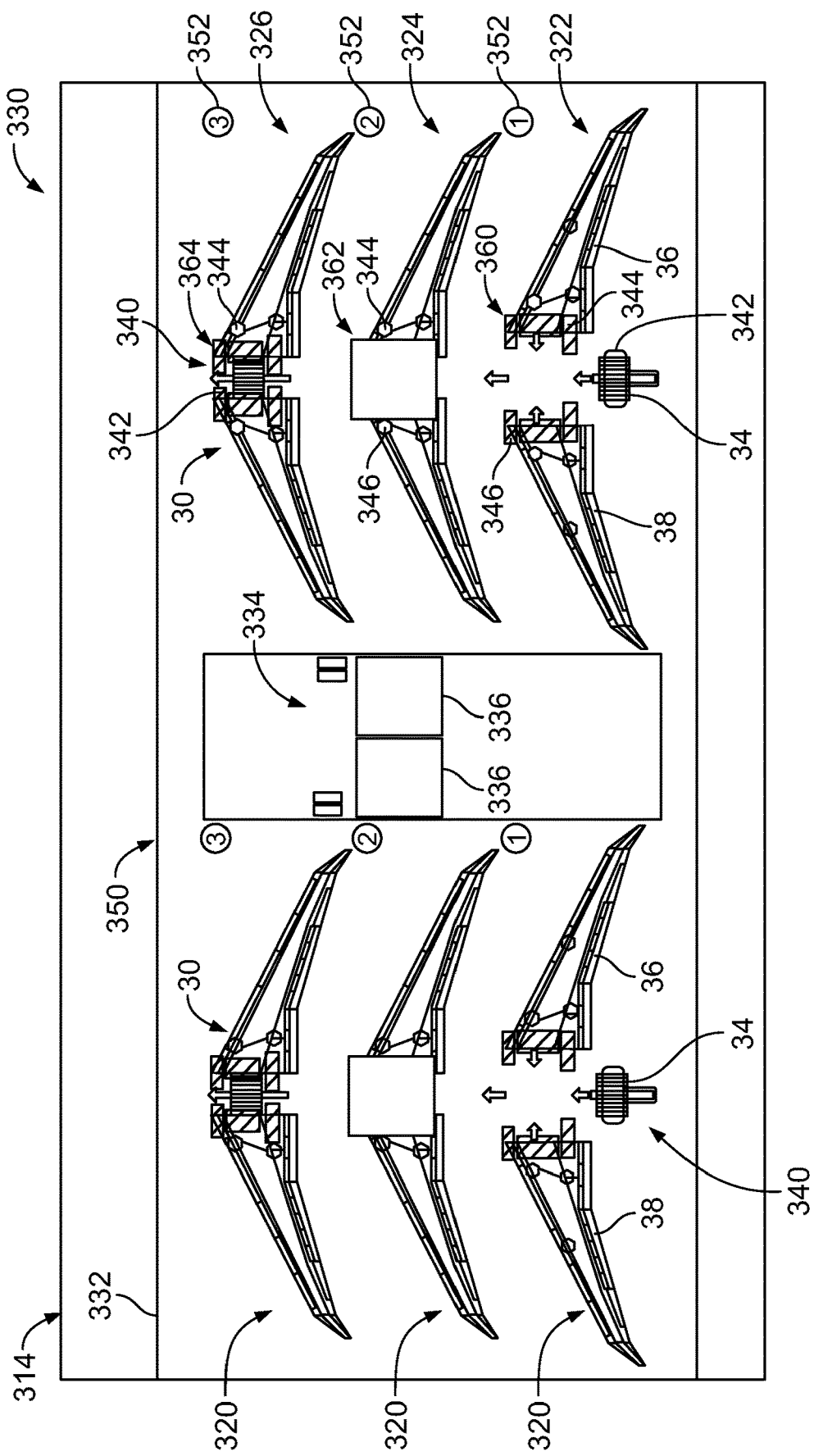
FIG. 6 is a top view of a wing join station in accordance with an example for the aircraft assembly system.

FIG. 6 is a top view of a wing join station 314 in accordance with an example for the aircraft assembly system 100. The wing join station 314 is similar to the wing join station 114 (shown in FIG. 2). However, the wing join station 314 includes two processing lines having three stages each in contrast to the wing join station 114 having a single processing line having four stages. Because the processing lines in the wing join station 314 has fewer stages than the processing line in the wing join station 114, the process is performed in each of the stages may be different than the stages performed at the wing join station 114. The layout of the wing join station 314 may allow for labor control and process control having a different rate and takt time than the layout of the wing join station 114.

A wing assembly manufacturing system 330 is provided in a work area 332 at the wing join station 314. The wing assembly manufacturing system 330 is used for joining the sections 34, 36, 38 of the wing assembly 30 and processing the wing assembly 30 to form a complete wing assembly 30, which may be transferred from the wing join station 314 to the wing-body join station 110 (shown in FIG. 1). The wing assembly manufacturing system 330 may be similar to the wing assembly manufacturing system 130 (shown in FIG. 2) and will not be described in detail herein; however, like components of the wing assembly manufacturing system 330 may operate in similar manner as like components of the wing assembly manufacturing system 130. The wing assembly manufacturing system 330 includes a positioning system 334 having a controller 336. The wing assembly manufacturing system 330 includes a motion system 340 having component support tools 342, 344, 346. The wing assembly manufacturing system 330 includes a metrology system 350 having a tracking device 352.

Various processing steps on the wing assembly 30 may be performed in the wing join station 314. In an example, the wing join station 314 has multiple positions or stages 320 in each processing line for progressing the wing assembly 30 through the wing join station 314. Different processes are performed at different stages 320 and the wing assembly 30 is moved upstream between the stages 320 before ultimately being transferred to the wing-body join station 110. In the illustrated example, each processing line of the wing join station 314 includes three stages 320. The various processes performed on the wing assembly 30 are performed at the different stages 320 such that there is little idle time at any particular stage 320. In an example, the wing assembly 30 is pulsed between the various stages 320 every four days; however, the processing lines are offset by two days. As such, a complete wing assembly 30 is completed and sent to the wing-body join station 110 at takt, such as every two days; however, other pulse times are possible in alternative examples, such as less than every two days.

At a first stage 322, the center wing section 34 and the right and left wing sections 36, 38 are loaded into the work area 332. The sections 34, 36, 38 may be loaded into the work area 332 using the component support tools 342, 344, 346. The controller 336 may control positioning of the component support tools 342, 344, 346 in the work area 332 based on position data received by the tracking device 352. Optionally, the component support tools 342, 344, 346 may load the sections 34, 36, 38 to predetermined positions and then the metrology system 350 may be used to verify positioning of the sections 34, 36, 38 relative to each other. The positions of the component support tools 342, 344, 346 may be modified or updated based on the actual positions sensed by the tracking device 352. Once the right and left wing sections 36, 38 are oriented relative to the center wing section 34, shims may be installed between the sections 34, 36, 38. The metrology system 350 may be used to verify positioning of the shims and/or their fry proper shim gaps between the sections 34, 36, 38. In other various examples, the shim gaps may be verified manually and positioning of the sections 34, 36, 38 may be adjusted based on the verified shim gaps.

The wing assembly manufacturing system 330 includes a processing station 360 at the first stage 322. The wing assembly 30 is processed at the processing station 360. At the processing station 360, the right and left wing sections 36, 38 are joined to the center wing section 34. For example, drilling operations may be performed at the first stage 322. Additionally, fasteners may be installed at the first stage 322 to join the right and left wing sections 36, 38 to the center wing section 34. In various examples, the wing assembly 30 may undergo a shakedown process at the second stage 324. In various examples, the wing assembly 30 may undergo a cleaning process at the second stage 324. Other processes may occur at the processing station 362 in other various examples.

Once the necessary processes are performed at the first stage 322, the wing assembly 30 is moved to the second stage 324. The positioning system 334 controls the movement between the first stage 322 and the second stage 324. The controller 336 operates the component support tools 342, 344, 346 to move the wing assembly 30 to the second stage 324. The position of the wing assembly 30 in the work area 332 may be verified by the tracking device 352 at the second stage 324.

The wing assembly manufacturing system 330 includes a processing station 362 at the second stage 324. At the processing station 362, wing assembly systems may be installed. The wing assembly systems may be installed across the wing assembly 30, such as between the interface between the center wing section 34 and the right wing section 36 and/or between the center wing section 34 and the left wing section 38. For example, components of the fuel system may be installed, such as the fuel tanks and fuel lines. Components of the hydraulic system may be installed, such as hydraulic lines, hydraulic pumps, and the like. Components of the electrical system may be installed, such as electrical grounding components. By completing the wing assembly 30 in the wing join station 314, the components of the wing assembly systems may be installed prior to the wing assembly 30 being joined to the fuselage 18. As such, overall assembly and manufacture time of the aircraft 10 may be reduced. Assembly and manufacture time in the main assembly line 106 may be reduced because the wing assembly systems can be completed in the wing join station 314 and the secondary assembly line 108 prior to the wing assembly 30 being transferred to the main assembly line 106 and joined to the fuselage 18.

In various examples, components of the wing assembly 30 may be sealed at the second stage 324. For example, interior surfaces of the center wing section 34 and/or the right wing section 36 and/or the left wing section 38 may be sealed. Components of the wing assembly systems may be sealed. For example, the fuel system may be sealed. Other processes may occur at the processing station 362 in other various examples.

Once the necessary processes are performed at the second stage 324, the wing assembly 30 is moved to a third stage 326. The positioning system 334 controls the movement between the second stage 324 and the third stage 326. The controller 336 operates the component support tools 342, 344, 346 to move the wing assembly 30 to the third stage 326. The position of the wing assembly 30 in the work area 332 may be verified by the tracking device 352 at the third stage 326.

The wing assembly manufacturing system 330 includes a processing station 364 at the third stage 326. At the processing station 364, components of the wing assembly 30 may undergo functional testing. For example, the fasteners may be tested. The wing assembly systems may be tested. For example, the fuel system, the hydraulic system, the electrical system, or other systems may be tested. The sealing of the wing assembly 30 may be tested. At the processing station 364, the wing assembly 30 may undergo an aqueous wash. At the processing station 364, the tank of the fuel system may be closed out. Other processes may occur at the processing station 364 in other various examples.

Once the necessary processes are performed at the third stage 326, the wing assembly 30 is complete and configured to be moved to the wing-body join station 110. The positioning system 334 may control the movement to the wing-body join station 110. In other various examples, the complete wing assembly 30 may be transferred from the component support tools 342, 344, 346 of the motion system 340 to another component, such as a crawler to transfer the complete wing assembly 30 to the wing-body join station 110.

Figure 7:
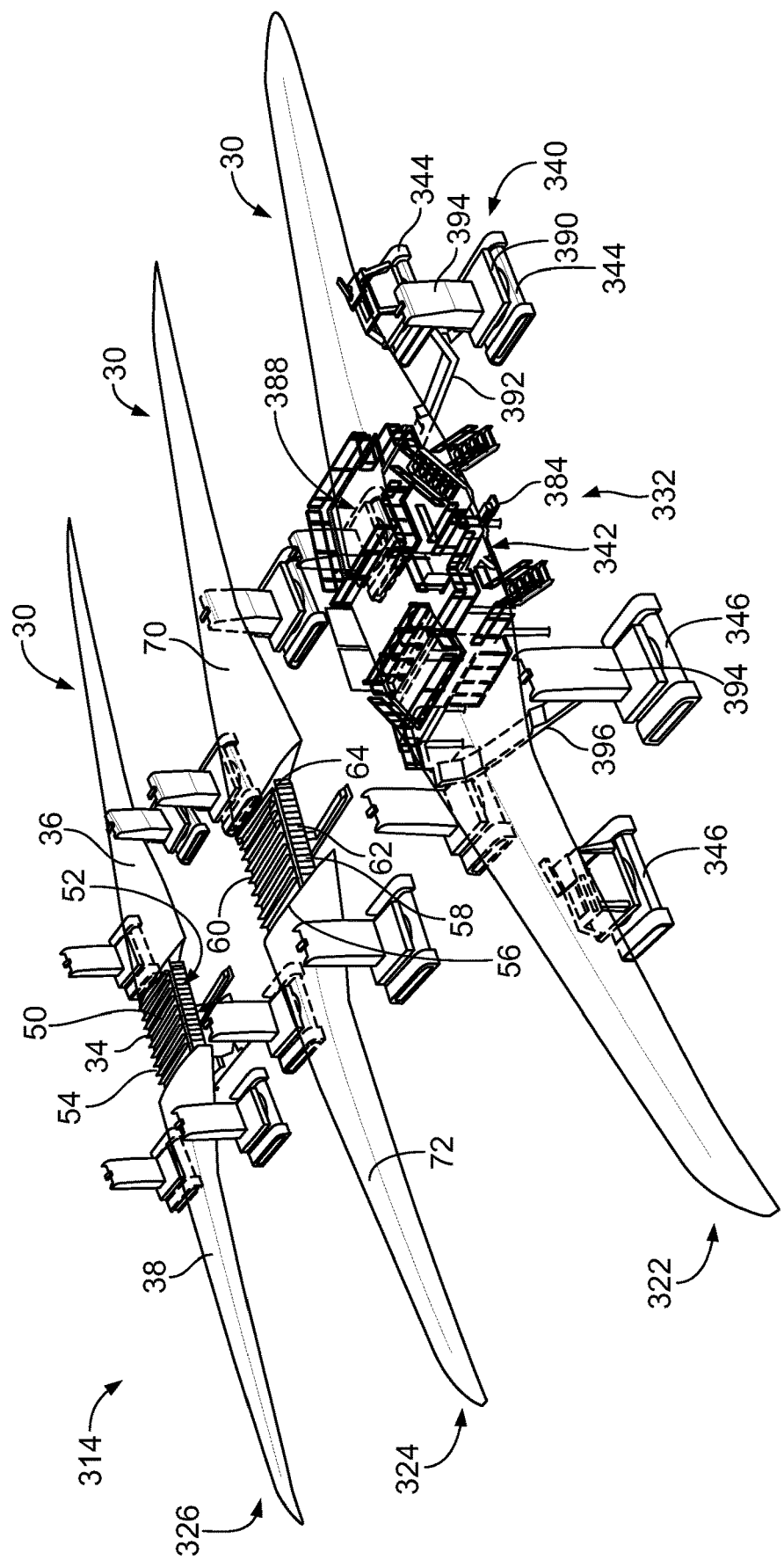
FIG. 7 is a perspective view of a portion of the wing join station in accordance with an example.

FIG. 7 is a perspective view of a portion of the wing join station 314 showing the wing assemblies 30 progressing through the stages 322, 324, 326 of one processing line of the wing join station 314. The right and left wing sections 36, 38 are joined to the center wing section 34 at the wing join station 314. FIG. 7 illustrates the wing box 50 of the center wing section 34 showing the wing box frame 52 and the wing box skin 54. The wing box skin 54 includes the upper skin 56 and the lower skin 58. The wing box frame 52 includes the front box spar 60 and the rear box spar 62. The wing box frame 52 includes the box ribs 64 and/or spanwise beams extending between the front and rear box spars 60, 62. The box ribs 64 may extend above and below the skins 56, 58. The lower keel beam 66 supports the wing box 50. The right and left wing sections 36, 38 are joined to the wing box 50. For example, the wing sections 36, 38 are joined to the wing box frame 52 at the front and rear box spars 60, 62 and/or the box ribs 64 and/or the spanwise beams, such as using fasteners and/or brackets. A skin 70, 72 of each wing section 36, 38, respectively, may be joined to the wing box skin 54, such as the upper skin 56 and the lower skin 58, such as using fasteners.

A work platform 388 is illustrated in FIG. 7 positioned around the wing assembly 30 to allow personnel to work safely on the wing assembly 30. The work platform 388 allows the personnel to access the upper and lower surfaces of the wing assembly 30, such as for drilling holes, installing fasteners, or performing other processes on the wing assembly 30, such as cleaning the wing assembly 30, sealing the wing assembly 30, installing systems in the wing assembly 30, and the like.

The motion system 340 supports the center wing section 34, the right wing section 36, and the left wing section 38 in the work area 332. For example, the center wing section 34 may be supported by a carriage 384. In the illustrated example, the right wing section component support tool 344 includes crawlers 390 supporting the right wing section 36. The crawlers 390 have jack towers 394 that are able to raise and lower to control the vertical positions of the support surfaces. The crawlers 390 may be positioned in front of and behind the right wing section 36 with a support beam 392 connected therebetween for supporting the right wing section 36. In other various examples, the crawlers 390 may be provided directly below the right wing section 36 for supporting the right wing section 36. When using multiple crawlers 390, movements of the crawlers 390 may be coordinated in unison, such as using the positioning system 334 (shown in FIG. 6). In other various examples, rather than using crawlers, the right wing section component support tool 344 may include one or more carriages on rails. In the illustrated example, the left wing section component support tool 346 includes crawlers 390 supporting the left wing section 38. The crawlers 390 may be positioned in front of and behind the left wing section 38 with a support beam 396 connected therebetween for supporting the left wing section 38. In other various examples, the crawlers 390 may be provided directly below the left wing section 38 for supporting the left wing section 38. When using multiple crawlers 390, movements of the crawlers 390 may be coordinated in unison, such as using the positioning system 334. In other various examples, rather than using crawlers, the left wing section component support tool 346 may include one or more carriages on rails.

The component support tools 342, 344, 346 may be used to move the wing assembly 30 to the next stage in the wing join station 314. In various examples, once the right and left wing sections 36, 38 are joined to the center wing section 34, one or more of the component support tools 342, 344, 346 may be taken off-line. For example, the component support tools 344, 346 may be unnecessary once the right and left wing sections 36, 38 are joined to the center wing section 34. In such examples, the center wing section component support tool 342 may be used to support the entire wing assembly 30 and move the wing assembly 30 between the various stages of the wing join station 314. In other examples, the component support tools 344, 346 may be used to support the wing assembly 30 through the downstream stages, thus eliminating the need for the center wing section component support tool 342 after the right and left wing sections 36, 38 are joined to the center wing section 34.

Figure 8:
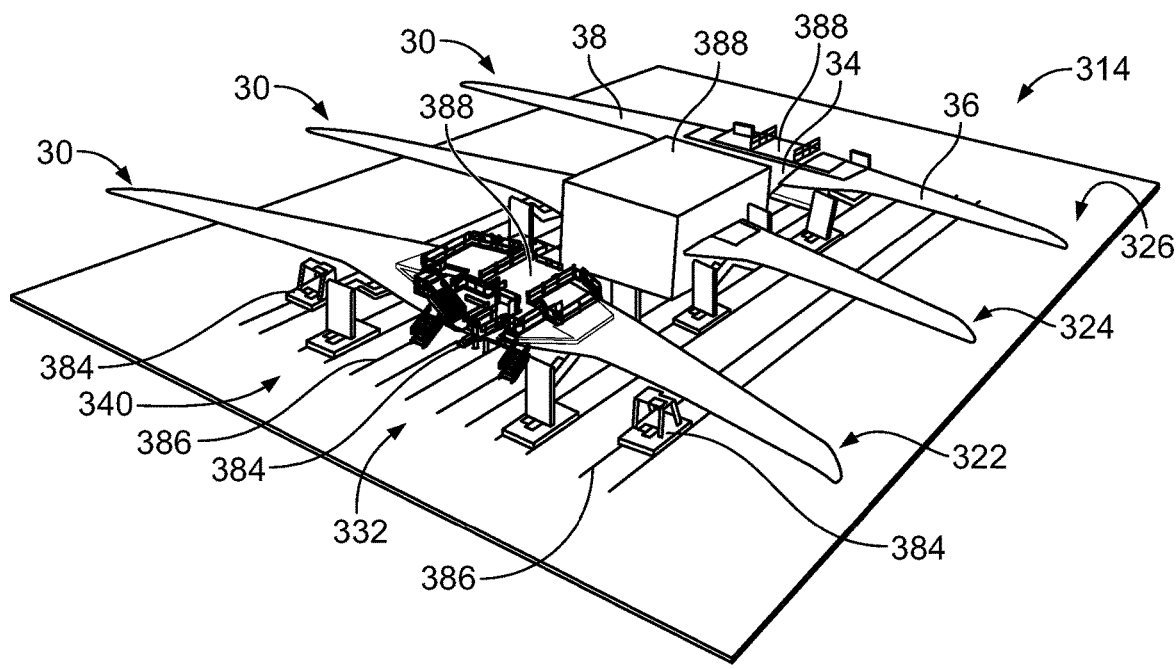
FIG. 8 is a perspective view of a portion of the wing join station in accordance with an example.

FIG. 8 is a perspective view of a portion of the wing join station 314 showing the wing assemblies 30 progressing through the stages 322, 324, 326 of one processing line of the wing join station 314. Work platforms 388 are provided at each of the stages 322, 324, 326. The motion system 340 supports the center wing section 34, the right wing section 36, and the left wing section 38 in the work area 332. For example, the sections 34, 36, 38 are supported by carriages 384 on rails 386. Movements of the carriages 384 may be coordinated in unison, such as using the positioning system 334. The work platform 388 may include a hot house, such as to enhance processing of one or more process steps performed at the corresponding stage 322, 324, 326.

Figure 9:
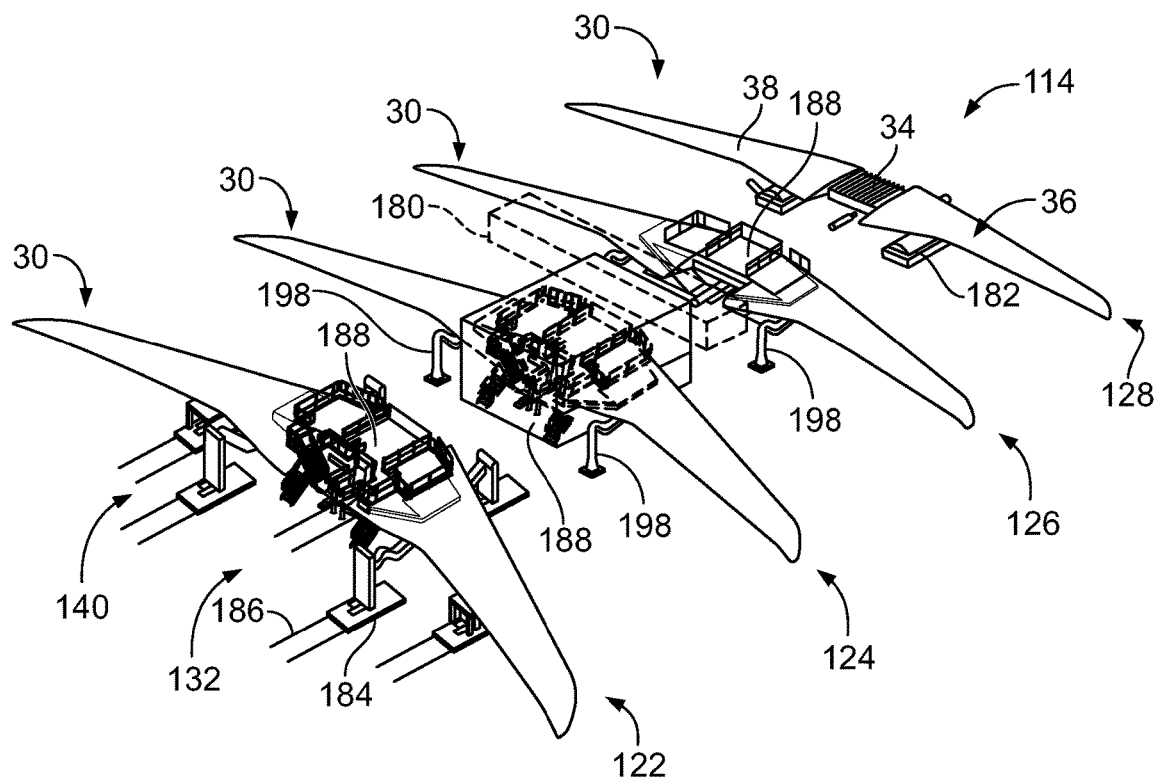
FIG. 9 is a perspective view of the wing join station in accordance with an example.

FIG. 9 is a perspective view of the wing join station 114 showing the wing assemblies 30 progressing through the stages 122, 124, 126, 128. Work platforms 188 are provided at the stages 122, 124, 126. The motion system 140 supports the center wing section 34, the right wing section 36, and the left wing section 38 in the work area 132. For example, at the first stage 122, the sections 34, 36, 38 are supported by carriages 184 on rails 186. Movements between the stages 122, 124, 126, 128 may be performed by the crane 180. Jack towers 198 are provided at the second and third stages 124, 126 to support the wing assembly 30; however, other types of supports may be used such as pogo towers. The crane 180 positions the wing assembly 30 and the jack towers 198 or the pogo towers may be positioned to support the wing assembly 30. Crawlers 182 support the wing assembly 30 at the fourth stage 128. The crawlers 182 may be used to move the wing assembly 30 from the wing join station 114 to the wing-body join station 110.

It is to be understood that the above description is intended to be illustrative, and not restrictive. For example, the above-described examples (and/or aspects thereof) may be used in combination with each other. In addition, many modifications may be made to adapt a particular situation or material to the teachings of the disclosure without departing from its scope. Dimensions, types of materials, orientations of the various components, and the number and positions of the various components described herein are intended to define parameters of certain examples, and are by no means limiting and are merely examples. Many other examples and modifications within the spirit and scope of the claims will be apparent to those of skill in the art upon reviewing the above description. The scope of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A method of manufacturing a wing assembly at a secondary assembly line for joining to a fuselage of an aircraft at a main assembly line in a manufacturing facility, the method comprising:
    loading a center wing section into a wing join station of the secondary assembly line in the manufacturing facility;
    loading a right wing section into the wing join station proximate to the center wing section;
    loading a left wing section into the wing join station proximate to the center wing section;
    joining the right and left wing sections to the center wing section in the secondary assembly line to form a complete wing assembly;
    moving the complete wing assembly to at least one processing station of the secondary assembly line remote from a wing-body join station of the main assembly line in the manufacturing facility;
    performing drilling operations on the complete wing assembly at the at least one processing station prior to moving the complete wing assembly to the wing-body join station;
    installing fasteners in the complete wing assembly at the at least one processing station prior to moving the complete wing assembly to the wing-body join station;
    communicatively coupling a first fuel component in the center wing section, a second fuel component in the right wing section, and a third fuel component in the left wing section at the at least one processing station with each other prior to moving the complete wing assembly to the wing-body join station; and
    moving the complete wing assembly to the wing-body join station of the main assembly line to join the complete wing assembly to the fuselage with the communicatively coupling of the first, second, and third fuel components completed at the secondary assembly line prior to moving to the main assembly line.

2. The method of claim 1, wherein said moving the complete wing assembly comprises moving the center wing section with the right and left wing sections joined thereto as a unit independent of the fuselage between the wing join station and the processing station.

3. The method of claim 1, further comprising providing a motion system having at least one component support tool, said loading a center wing section comprising loading the center wing section using the at least one component support tool, said loading the right wing section comprising loading the right wing section using the at least one component support tool, and said loading a left wing section comprises loading the left wing section using the at least one component support tool.

4. The method of claim 1, wherein said moving the complete wing assembly comprises:
providing a motion system having a component support tool supporting at least one of the center wing section, the right wing section, and the left wing section; and
moving the component support tool on a rail between the wing join station and the processing station.

5. The method of claim 1, wherein said moving the complete wing assembly comprises:
providing a motion system having a component support tool supporting at least one of the center wing section, the right wing section, and the left wing section; and
moving the component support tool by a crane or a crawler between the wing join station and the processing station.

6. The method of claim 1, further comprising providing a metrology system having a tracking device for locating the center wing section, the right wing section, and the left wing section, said moving the complete wing assembly to the processing station comprises using the tracking device to locate the complete wing assembly in the processing station.

7. The method of claim 1, wherein said moving the complete wing assembly to the processing station comprises using a positioning system having a controller to track relative positions of the center wing section, the right wing section, and the left wing section to locate the center wing section, the right wing section, and the left wing section in the processing station.

8. The method of claim 1, wherein said moving the complete wing assembly to the processing station comprises moving the complete wing assembly to a first processing station and moving the complete wing assembly to a second processing station.

9. The method of claim 1, wherein said moving the complete wing assembly to the processing station comprises moving the complete wing assembly to a first processing station and moving the complete wing assembly to a second processing station, said performing drilling operations on the complete wing assembly comprises performing drilling operations on the complete wing assembly at the first processing station and performing drilling operations on the complete wing assembly at the second processing station, said installing fasteners in the complete wing assembly comprises installing fasteners in the complete wing assembly at the first processing station and installing fasteners in the complete wing assembly at the second processing station.

10. The method of claim 1, further comprising performing a shakedown of the complete wing assembly at the at least one processing station prior to moving the complete wing assembly to the wing-body join station.

11. The method of claim 1, further comprising installing electrical grounding systems in the complete wing assembly at the at least one processing station prior to moving the complete wing assembly to the wing-body join station.

12. The method of claim 1, further comprising performing sealing operations on interior surfaces of the complete wing assembly at the at least one processing station prior to moving the complete wing assembly to the wing-body join station.

13. The method of claim 1, further comprising closing out a fuel tank of the complete wing assembly at the at least one processing station prior to moving the complete wing assembly to the wing-body join station.

14. The method of claim 1, further comprising completing sealing of the complete wing assembly at the at least one processing station prior to moving the complete wing assembly to the wing-body join station.

15. The method of claim 1, further comprising hydraulically coupling a first hydraulic component in the center wing section and a second hydraulic component in the right wing section and a third hydraulic component in the left wing section at the at least one processing station prior to moving the complete wing assembly to the wing-body join station.

16. The method of claim 1, further comprising:
providing a motion system having at least one component support tool, said loading a center wing section comprising loading the center wing section using the at least one component support tool, said loading a right wing section comprising loading the right wing section using the at least one component support tool, and said loading a left wing section comprises loading the left wing section using the at least one component support tool;
providing a metrology system having a tracking device for locating the right wing section, the left wing section, and the center wing section in a manufacturing facility;
providing a positioning system having a controller communicatively coupled to the tracking device and receiving position data of the right wing section, the left wing section, and the center wing section, the controller being operably coupled to the at least one component support tool; and
controlling relative positioning of the component support tool in the manufacturing facility based on the position data relating to the right wing section, the left wing section, and the center wing section.

17. The method of claim 16, wherein said controlling relative positioning of the component support tool comprises moving the complete wing assembly from the processing station to a second processing station where at least one task is performed on the wing assembly prior to moving the complete wing assembly to the wing-body join station.

18. The method of claim 16, wherein the tracking device of the metrology system includes a laser tracking device, said metrology system being operable to emit at least one laser beam from the laser tracking device to determine a position of the right wing section, the left wing section and the center wing section.

19. A method of manufacturing a wing assembly at a secondary assembly line remote from a main assembly line, the wing assembly including a center wing section, a right wing section, and a left wing section for joining the wing assembly to a fuselage of an aircraft, the method comprising:
providing a motion system having at least one component support tool for moving the right wing section, the left wing section, and the center wing section in a manufacturing facility;

providing a metrology system having a tracking device for locating the right wing section, the left wing section, and the center wing section in the manufacturing facility;

providing a positioning system having a controller communicatively coupled to the tracking device and receiving position data of the right wing section, the left wing section, and the center wing section, the controller being operably coupled to the at least one component support tool;

controlling relative positioning of the component support tool in the manufacturing facility based on the position data relating to the right wing section, the left wing section, and the center wing section to move the center wing section, the right wing section and the left wing section into a wing join station at the secondary assembly line using the at least one component support tool;

joining the right and left wing sections to the center wing section to form a complete wing assembly at the secondary assembly line;

controlling relative positioning of the component support tool in the manufacturing facility based on the position data relating to the right wing section, the left wing section, and the center wing section to move the complete wing assembly to at least one processing station at the secondary assembly line remote from a wing-body join station at the main assembly line for performing at least one processing task on the complete wing assembly;

performing drilling operations on the complete wing assembly at the at least one processing station at the secondary assembly line prior to moving the complete wing assembly to the wing-body join station at the main assembly line;

installing fasteners in the complete wing assembly at the processing station at the secondary assembly line prior to moving the complete wing assembly to the wing-body join station at the main assembly line;

installing electrical grounding systems in the complete wing assembly at the at least one processing station at the secondary assembly line prior to moving the complete wing assembly to the wing-body join station at the main assembly line;

performing sealing operations on interior surfaces of the complete wing assembly at the at least one processing station at the secondary assembly line prior to moving the complete wing assembly to the wing-body join station at the main assembly line;

communicatively coupling a first fuel component in the center wing section, a second fuel component in the right wing section, and a third fuel component in the left wing section with each other at the at least one processing station at the secondary assembly line prior to moving the complete wing assembly to the wing-body join station at the main assembly line; and controlling relative positioning of the component support tool in the manufacturing facility based on the position data relating to the right wing section, the left wing section, and the center wing section to move the complete wing assembly to the wing-body join station at the main assembly line to join the complete wing assembly to the fuselage.

20. The method of claim 19, further comprising hydraulically coupling a first hydraulic component in the center wing section and a second hydraulic component in the right wing section and a third hydraulic component in the left wing section at the at least one processing station prior to moving the complete wing assembly to the wing-body join station.

* * * * *